United States Patent [19]
Ptak

[11] 3,765,295
[45] Oct. 16, 1973

[54] PLASTIC DRIVE PIN ANCHOR
[75] Inventor: Wilbur F. Ptak, Middleburg Heights, Ohio
[73] Assignee: Fastway Fasteners, Inc., Lorain, Ohio
[22] Filed: Aug. 18, 1971
[21] Appl. No.: 172,841

[52] U.S. Cl. .................................. 85/72, 85/83
[51] Int. Cl. ............................... F16b 13/06
[58] Field of Search .................. 85/72, 83, 84, 82

[56] References Cited
UNITED STATES PATENTS
| | | |
|---|---|---|
| 2,941,439 | 6/1960 | Rapata............................. 85/72 |
| 3,232,161 | 2/1966 | Fernberg.......................... 85/72 |
| 3,302,913 | 2/1967 | Collyer et al. ................ 85/72 UX |
| 3,411,397 | 11/1968 | Birmingham...................... 85/72 |
| 3,417,438 | 12/1968 | Schuplin......................... 85/72 X |
| 3,461,772 | 8/1969 | Barry............................. 85/83 |

FOREIGN PATENTS OR APPLICATIONS
| | | |
|---|---|---|
| 632,384 | 12/1962 | Belgium.......................... 85/72 |
| 971,370 | 9/1964 | Great Britain.................... 85/72 |
| 1,218,275 | 1/1971 | Great Britain.................... 85/72 |

Primary Examiner—Ramon S. Britts
Attorney—William Isler et al.

[57] ABSTRACT

A plastic drive-pin anchor is disclosed of the type in which the drive-pin is molded integrally with an expandable fastener or anchor. The pin is provided with circumferentially spaced ribs which are so located in relation to the anchor and so connected or molded integrally with the anchor as not only to resist accidental breakage of the pin from the anchor, but also to facilitate shearing of the pin from the anchor when the pin is driven into the anchor to expand the latter.

6 Claims, 12 Drawing Figures

PATENTED OCT 16 1973 3,765,295
SHEET 1 OF 3

INVENTOR
WILBUR F. PTAK
BY
*Isler & Ornstein*
ATTORNEYS

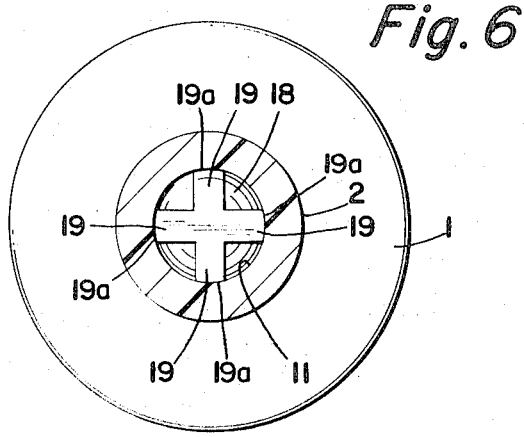
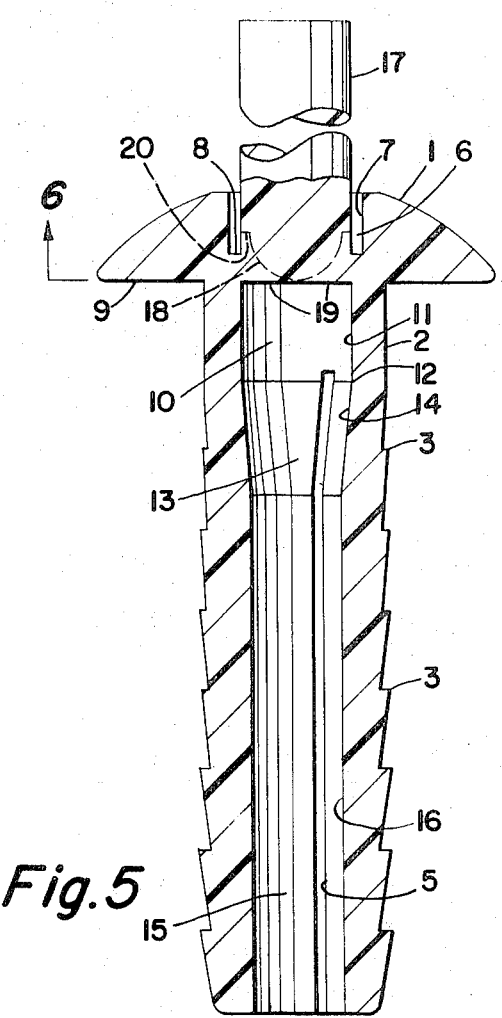
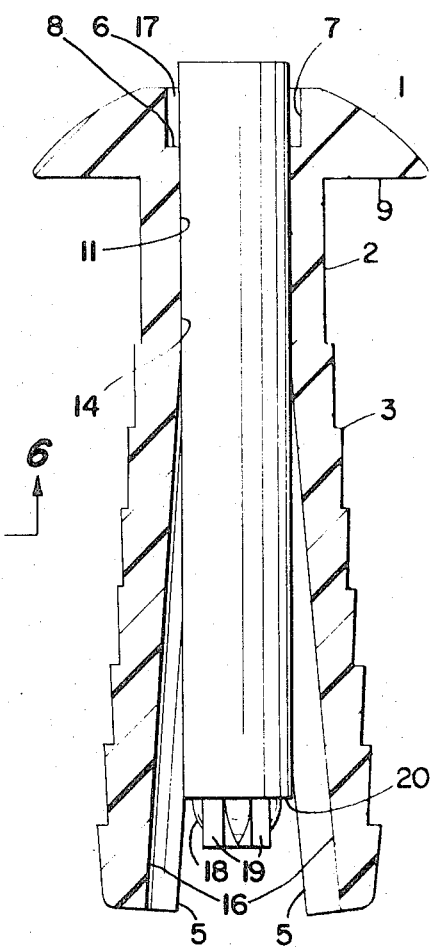

INVENTOR
WILBUR F. PTAK

PLASTIC DRIVE PIN ANCHOR

In U.S. Pat. Nos. 2,402,287; 2,941,439; 2,956,468 and 3,203,304, plastic fasteners for rivets are disclosed, in which an expander head or drive pin is molded integrally with an anchor or expandable fastener comprising a head and a shank, and a passageway extending through the head and shank.

The expander head or pin is of substantially the same diameter as the upper portion of the passageway, and, in all cases, the head is joined to the head by a frangible annular web which interconnects the lower end of the expander head or pin with the head of the expandable fastener at a point or level at the upper end of the passageway in the head.

After the expandable fastener is inserted in an opening or openings, for the purpose of securing it in such opening or openings, the head of the expander head or pin is struck with a hammer, thereby breaking or shearing the aforesaid frangible web, and continued blows of the hammer force the expander head or pin into the passageway, causing the shank of the anchor to expand to fill the opening or openings, thereby securing the expandable fastener in position.

Due to the fact that the frangible web is located at or very close to the upper end of the passageway in the head, the first hammer blow, if not directed properly, is likely to break off the expander head or pin, so that it can be used only by reinserting it in the passageway, and holding it while it is being driven into the expandable fastener.

Moreover, even if the expander head or drive pin is not broken off in this manner, it is subject to being broken off during handling or shipment of the fasteners, due to improper packing or handling.

In any event, the use of fasteners made in the aforesaid manner is disadvantageous, for the reasons stated, as well as for other reasons, including difficulties in molding the fastener with a proper web thickness.

The present invention has, as its primary object, the provision of a plastic fastener or rivet, of the character described, in which the expander head or pin is so connected with the head of the expandable fastener as not only to resist breaking off, due to a misdirected hammer blow, or for other reasons, but also to retain the expander head or pin in proper position, even if it should become accidentally broken or severed from the head, prior to its being driven into the expandable fastener.

Another object of the invention is to provide a plastic fastener or rivet of the character described, in which the expander head or pin is so connected with the head of the expandable fastener, as to greatly facilitate the breaking or shearing of the connection with the head while being driven into the expandable fastener.

A further object of the invention is to provide a plastic fastener or rivet of the character described, in which the connection between the expander head or pin and the head of the expandable fastener is of unique design or character, which readily lends itself to manufacture by conventional molding processes.

Other objects and advantages of my invention will be apparent during the course of the following description.

In the accompanying drawings forming a part of this specification, and in which like numerals are employed to designate like parts throughout the same, FIG. 1 is a top plan view, on a greatly enlarged scale, of a plastic drive-pin anchor, embodying the invention;

FIG. 5 is a cross-sectional view, taken on the line 5—5 of FIG. 1;

FIG. 6 is a cross-sectional view, taken on the line 6—6 of FIG. 5;

FIG. 7 is a view similar to FIG. 4, but showing the drive-pin driven into the position in which it locks the anchor in an opening or the like;

Figure 1:
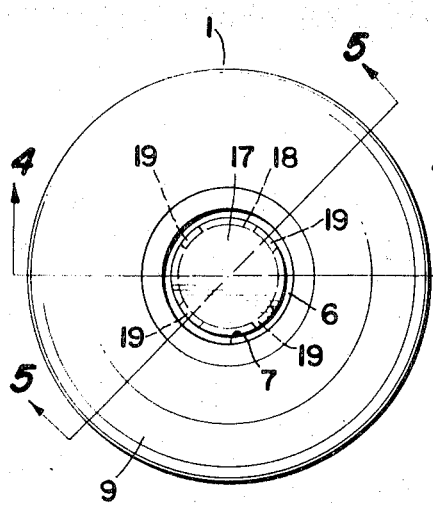
Figure 2:
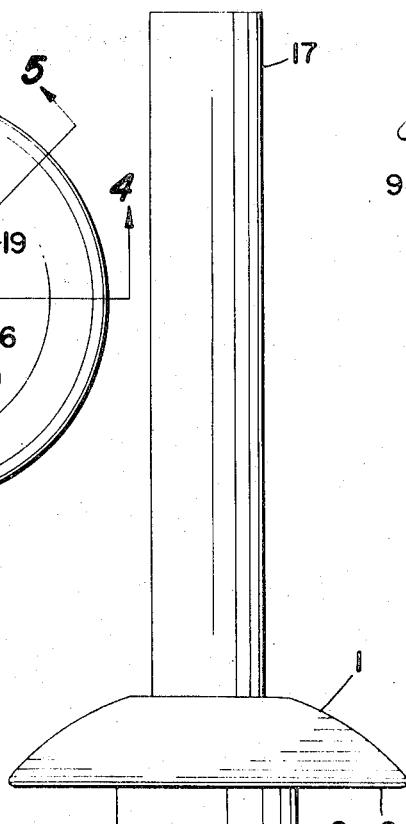
FIG. 2 is an elevational view of the drive-in anchor.
Figure 4:
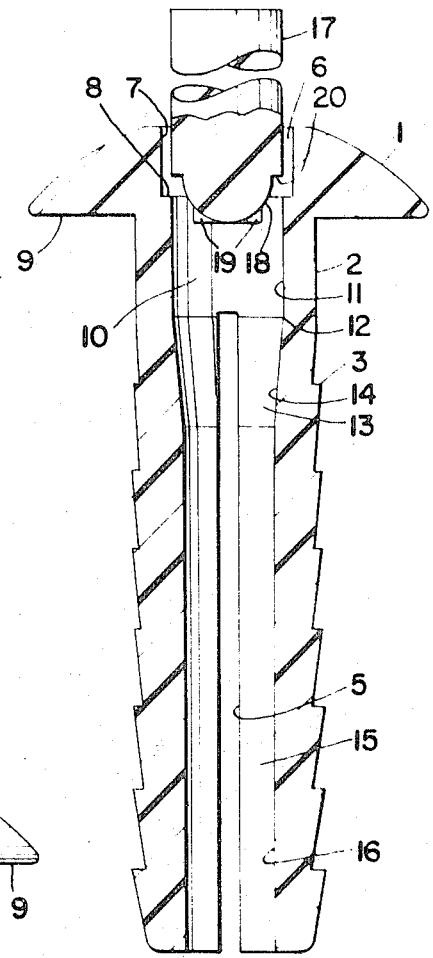
FIG. 4 is a cross-sectional view, taken on the line 4—4 of FIG. 1.
Figure 3:
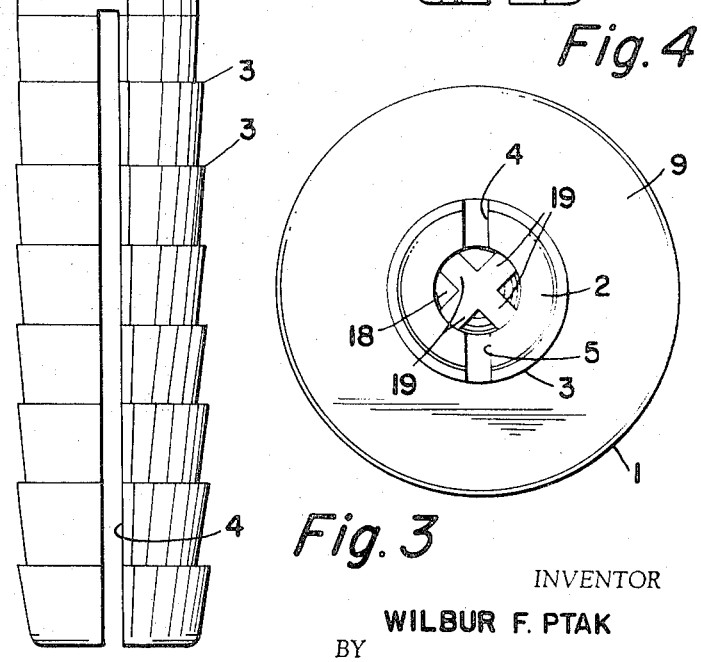
FIG. 3 is a bottom plan view of the drive-pin anchor.

Referring more particularly to FIGS. 1 to 6 inclusive of the drawings, there is disclosed an expandable fastener or anchor, molded, in a single piece, of Nylon or like plastic, and comprising a head 1 and a cylindrical shank 2 which depends from the head, and is provided on its outer surface with longitudinally spaced serrations or teeth 3, which aid in gripping the shank to the wall of a bore when the shank is expanded, in a manner to be presently described.

The head 1 of the anchor is provided with a central opening or recess 6 having a cylindrical wall 7, the recess 6 extending from the upper end of the head 1 to a bottom 8, which is slightly above the lower end 9 of the head, but substantially below the upper end of the head.

The recess 6 communicates with a passageway 10 having a cylindrical wall 11 of a diameter slightly less than the diameter of the wall 7, and which extends from the bottom 8 of the recess 6 to a point 12 (FIG. 5), which is substantially below the lower end 9 of the head.

The passageway 10 communicates with a passageway 13 having a conical wall 14, and the passageway 13, in turn, communicates with a passageway 15, in the shank 2, having a cylindrical wall 16, of a diameter less than the diameter of the wall 11, and which extends from the lower end of the wall 14 to the lower end of the shank 2.

A solid drive pin 17 is also provided, which is also formed or Nylon or like plastic, and is molded integrally with the expandable anchor, this pin being of a length substantially the same as the combined length of the passageways 10, 13 and 15, and of a diameter substantially the same as the diameter of the wall 11 of the passageway 10, the diameter of the pin being thus slightly less than that of the wall 7 of the recess 6 in the head 1.

An important feature of the invention resides in the manner in which the drive pin 17 is molded or secured integrally with the anchor.

For this purpose, the lower end of the pin 17 is formed with a substantially hemi-spherical or ball-like protrusion 18, of a diameter slightly less than the diameter of the pin 17, and from which four circumferentially-spaced ribs 19 (see FIGS. 5 and 6) extend radially outwardly, and terminate in arcuate ends 19a, which are co-planar with the wall 11, such terminal ends being molded integrally with the anchor. These ribs extend vertically from the shoulder 20 which is formed by the juncture of the protrusion 18 with the lower flat end of the pin 17, downwardly to a level which coincides substantially with the lower end of the protrusion 18, and, in relation to the recess 6, extend vertically downward from a point just above the recess bottom 8 to a point below the recess 8, as best seen in FIG. 5.

When the anchor is to be secured in a hole or bore, the shank 2 is inserted in the hole or bore, with the face 9 of the head disposed against the surface in which the hole or bore exists, and the pin 17 is then driven into the anchor, by means of a hammer, to the position shown in FIG. 7.

In the course of being thus driven into the anchor, the connections of the arcuate ends 19a of the ribs 19 with the wall 11 of the passageway 10 become sheared, and after these connections are sheared, the continued movement of the pin 17 into the shank causes the two portions of the shank at opposite sides of the slots or slits 4 and 5 to diverge from each other (see FIG. 7), due to the camming action of the pin against the conical wall 14 of the passageway 13.

As the two portions of the shank diverge, the serrations or teeth 3 come into tight engagement with the wall of the bore and thus cause the anchor to be tightly gripped in the bore.

Due to the fact that the ribs 19 are connected to the wall 11 of the passageway 10 at points substantially below the upper end of the head 1, and, in fact, at points adjacent the bottom 9 of the head, it is virtually impossible for a hammer blow, even if misdirected, to cause the drive pin to break away from the head prior to its being driven into the expandable fastener or anchor. The tendency, in fact, is to resist breaking away, in such a manner, even if the hammer blow or blows are not in a direction exactly in axial alignment with the drive pin.

Due to the fact that the drive pin is connected to the anchor at only a few circumferentially-spaced points, rather than by a continuous annular or circular web or otherwise, the shearing of the pin from the expandable fastener or anchor is accomplished with little or no effort, that is to say, the separation of the pin from the anchor is greatly facilitated, when the pin is driven into the anchor.

The connection, moreover, is such that the pin cannot be accidently broken from the anchor during improper handling or shipment, or improper packing.

The design or character of the connection, furthermore, is such that it readily lends itself to manufacture of this item by conventional molding processes, and at relatively low cost.

Although the head 1 of the expandable fastener or anchor is shown, in this instance, as being of the so-called "mushroom" type, the head may, if desired, be of the so-called "round" or "flat" types.

Referring now to that form of the invention shown in FIGS. 8 to 12 inclusive, of the drawings, there is disclosed an expandable fastener or anchor, molded, in a single piece, of Nylon or like plastic, and comprising a head 21 and a cylindrical shank 22 which depends from the head.

The head 21 of the anchor is provided with a central opening or recess 23 having a cylindrical wall 24, the recess 23 extending from the upper end of the head 21 to a bottom 25, which is slightly above the lower end 26 of the head, but substantially below the upper end of the head.

The recess 23 communicates with a passageway 27 having a cylindrical wall 28 of a diameter slightly less than the diameter of the wall 24, and which corresponds to the wall 11 of the previously described form of the invention.

A solid drive pin 29 is also provided, which is also formed of Nylon or like plastic, and is molded integrally with the expandable anchor, this pin being similar in length to that of the pin 17, and of a diameter substantially the same as the diameter of the wall 28 of the passageway 27, the diameter of the pin being thus slightly less than that of the wall 24 of the recess 23 in the head 21.

An important feature of the invention resides in the manner in which the drive pin 29 is molded or secured integrally with the anchor.

For this purpose, the lower portion of the pin is provided with four circumferentially spaced ribs 30, molded integrally with the pin, and which extend radially-outwardly from the pin to the wall 24 of the anchor, and the terminal ends of which are molded integrally with the anchor. These ribs 30 extend vertically from the lower end 31 of the pin, which end is slightly above the bottom 25 of the recess 23, to a point 32, which is slightly below the upper end of the recess 23.

Figure 8:
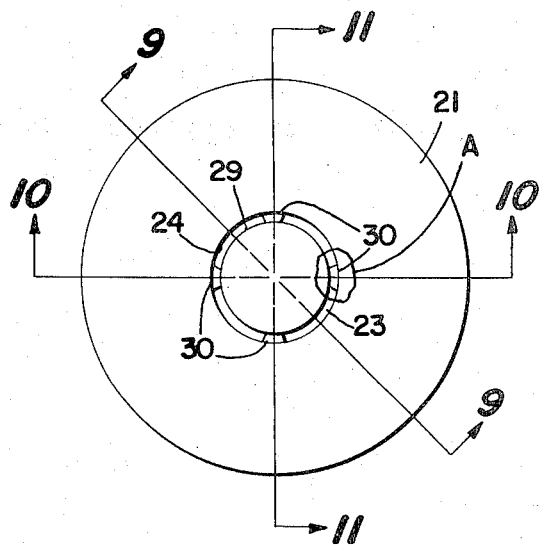
FIG. 8 is a view similar to FIG. 1, but showing another form of the drive-pin anchor.
Figure 9:
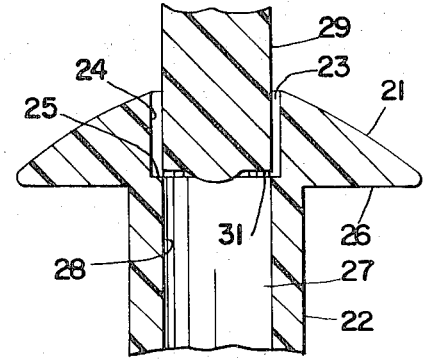
FIG. 9 is a fragmentay cross-sectional view similar to FIG. 4, and taken on the line 9—9 of FIG. 8.
Figure 10:
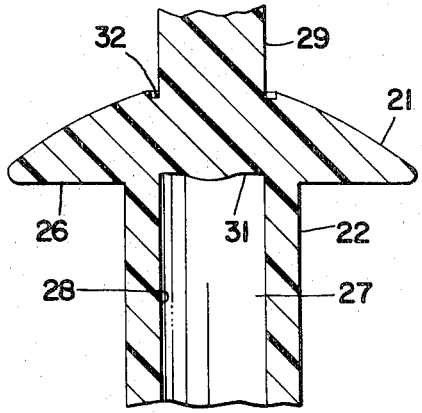
FIG. 10 is a fragmentary cross-sectional view similar to FIG. 5, and taken on the line 10—10 of FIG. 8.
Figure 11:
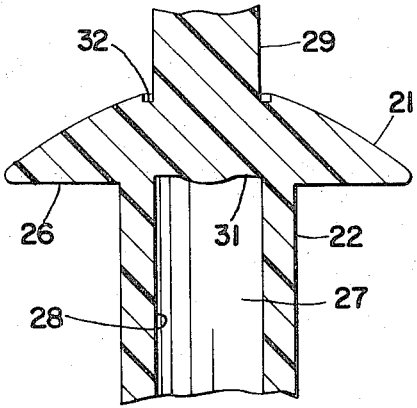
FIG. 11 is a fragmentary cross-sectional view, taken on the line 11—11 of FIG. 8.
Figure 12:
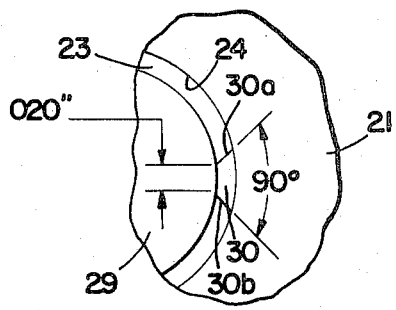
FIG. 12 is a fragmentary view, on an enlarged scale, of the portion of FIG. 8, which is indicated by the circumscribed line A.

As best seen in FIGS. 8 and 12, the ribs 30 are of a cross-sectional conformation which is similar to that of an isosceles trapezoid, the sides 30a and 30b of which are at an angle of about 90° to each other, and the larger base of which, i.e., the base which joins the anchor, is approximately twice as long as the smaller base, i.e., the base which joins the drive pin.

When the anchor is to be secured in a hole or bore, the shank 22 is inserted in the hole or bore, with the end 26 of the head disposed against the surface in which the hole or bore exists, and the pin 29 is then driven into the anchor, by means of a hammer, to a position corresponding to the position shown in FIG. 7.

In the course of being thus driven into the anchor, the pin is sheared from the ribs 30, and the ribs remain in situ in the recess 23, and after such shearing, the continued movement of the pin into the shank causes the anchor to be spread in the manner already described with reference to FIG. 7.

In actual practice, the length of the ribs 30 is approximately 0.105 inch, the distance from the lower ends of the ribs to the bottom 25 of the recess 23 is about 0.010 inch, and the distance from the upper ends of the ribs to the upper end of the recess 23 is about 0.010 inch, so that the ribs are about 0.020 inch shorter than the thickness of the head. This provides spaces at each end of the ribs which prevent spalling out of the plastic material when the pin is sheared from the ribs by the hammer blow.

The connections of the ribs to the drive pin, as shown in FIG. 12, are 0.020 inch in width, so that the total shear area of the four ribs will be about 0.0084 (0.105 × 0.020 × 4). This total shear area is so small that the shearing of the pin from the ribs is accomplished with little or no effort. At the same time, the length of the ribs combined with the larger areas of the connections of the ribs to the head of the anchor, make it virtually impossible for a hammer blow, even if misdirected, to cause the drive pin to break away from the head prior to its being driven into the expandable anchor. The tendency, in fact, is to resist breaking away, in such a manner, even if the hammer blow or blows are not in a direction exactly in axial alignment with the drive pin.

The connection of the pin and anchor, moreover, is such that the pin cannot be accidently broken from the anchor during improper handling or shipment, or improper packing.

It is to be understood that forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention I claim:

1. A one-piece plastic drive-pin combination anchor comprising an anchor portion and a solid drive pin molded integrally with the anchor portion, said anchor portion provided with a head having a central recess therein extending downwardly from the upper end of the head to a bottom spaced slightly above the lower end of the head, but substantially below the upper end of the head, said recess having a cylindrical wall, said anchor portion having a substantially cylindrical shank provided with external longitudinally-spaced teeth, said anchor portion having a first passageway in its upper end which extends downwardly from said bottom and has a cylindrical wall of slightly lesser diameter than the diameter of said recess, a second passageway extending downwardly from the lower end of said first-named passageway and having a conical wall, and a third passageway extending downwardly from said second passageway and having a cylindrical wall of lesser diameter than said first-named passageway, said drive pin having a substantially flat upper end, a cylindrical outer wall of substantially the same diameter as the wall of said first-named passageway, a length substantially equivalent to the combined length of all of said passageways and terminating in a hemispherical lower end portion of a diameter less than the diameter of said cylindrical outer wall thereby defining a shoulder at the point of interconnection of said hemispherical end and said cylindrical outer wall, and a plurality of circumferentially spaced ribs at the lower end of said drive pin and integrally connecting arcuate portions of the hemispherical end portion of the drive pin to said anchor portion, said connection extending completely between said shoulder and the lower portion of said hemispherical end portion with said anchor portion at least in the area adjacent the bottom of said recess but terminating below the top thereof.

2. A plastic drive pin anchor, as defined in claim 1, wherein said ribs are connected integrally with the wall of said recess.

3. A plastic drive pin anchor, as defined in claim 2, wherein said ribs have a cross-sectional contour such that the areas of connection of the ribs with the pin are smaller than the areas of connection of the ribs with the wall of said recess.

4. A plastic drive pin anchor, as defined in claim 3, wherein said ribs have a cross-sectional contour substantially in the shape of an isosceles trapezoid, with their smaller bases connected to said drive pin and their larger bases connected to said head.

5. A plastic drive pin anchor, as defined in claim 4, wherein said ribs have a length substantially the same as the depth of said head.

6. A plastic drive pin anchor, as defined in claim 5, wherein the sides of said ribs are at an angle of about 90° to each other.

* * * * *